United States Patent [19]

Takahashi et al.

[11] Patent Number: 4,564,876
[45] Date of Patent: Jan. 14, 1986

[54] ROTARY MAGNETIC HEAD DEVICE

[75] Inventors: Toshinori Takahashi, Kawasaki; Hisanori Tsumiyama; Keigo Okano, both of Yokohama; Yoshitaka Iwabuchi, Yamato, all of Japan

[73] Assignee: Victor Company of Japan, Ltd., Yokohama, Japan

[21] Appl. No.: 443,922

[22] Filed: Nov. 23, 1982

[30] Foreign Application Priority Data

Nov. 30, 1981 [JP] Japan .................. 56-192495

[51] Int. Cl.[4] .......... G11B 5/52; G11B 21/04; G11B 21/18
[52] U.S. Cl. .................. 360/107; 360/10.2; 360/77; 360/84
[58] Field of Search ............... 360/10.1–10.3, 360/75, 77, 84–85, 107, 109

[56] References Cited

U.S. PATENT DOCUMENTS

| 3,375,331 | 3/1968 | Okazaki | 360/10.2 X |
| 3,995,317 | 11/1976 | Schmidt | 360/109 |
| 4,212,043 | 7/1980 | Baker | 360/109 X |
| 4,236,185 | 11/1980 | Obremski | 360/10.2 |
| 4,446,497 | 5/1984 | Hirayama | 360/109 |

FOREIGN PATENT DOCUMENTS 2944108  5/1980  Fed. Rep. of Germany.

OTHER PUBLICATIONS

IBM TDB; vol. 12, No. 1, Jun. 1969; Video Tape Recorder with Oscillating Head; G. E. Price.

Primary Examiner—A. J. Heinz
Attorney, Agent, or Firm—Louis Bernat

[57] ABSTRACT

A rotary magnetic head device comprises a rotary body mounted with rotary magnetic heads which rotate while scanning over a traveling magnetic tape, where the heads scan over tracks formed obliquely with respect to the longitudinal direction of the tape to reproduce recorded signals, a bearing mechanism for bearing the rotary body in a freely rotatable state and so that the rotary body is freely displaceable along an axial direction thereof, and a displacing mechanism for displacing the rotary body along the axial direction thereof so that the heads follow and scan over the tape.

9 Claims, 16 Drawing Figures

ROTARY MAGNETIC HEAD DEVICE

BACKGROUND OF THE INVENTION

The present invention generally relates to rotary magnetic head devices, and more particularly to a rotary magnetic head device which is controlled of its height position so that rotary magnetic heads can accurately scan over tracks on a magnetic tape.

The assignee of the present application has previously proposed a system capable of recording and reproducing a color video signal on tracks which are formed on a tape without gaps between adjacent tracks, without being affected by beat disturbance. This previously proposed system is described in a U.S. Pat. No. 4,178,606 entitled "COLOR VIDEO SIGNAL RECORDING AND/OR REPRODUCING SYSTEM". According to this system, a pair of azimuth heads have gaps which are inclined by a certain azimuth angle in mutually opposite directions with respect to a direction perpendicular to the longitudinal direction of the track. Adjacent tracks are formed side by side in contiguous contact, without a gap or guard band formed therebetween. In order to prevent beat disturbance from being introduced in the color video signal, the phase of the chrominance signal is shifted by 90° for every one horizontal scanning period. In addition, the direction of the above phase shift is reversed from one track to the adjacent track. According to this previously proposed system, the tape utilization efficiency is high because the tracks are in close contact with each other. Furthermore, beat disturbance is not introduced.

On the other hand, there was a conventional system wherein the video signal is recorded on a magnetic tape along parallel tracks which are formed obliquely with respect to the longitudinal direction of the magnetic tape. The tape may either be stopped or caused to travel at speeds different from the tape speed upon recording, in order to carry out a speedchange reproduction such as a quick-motion reproduction, slow-motion reproduction, and still-picture reproduction. However, because the tape speed upon reproduction is different from the tape speed upon recording during the speed-change reproduction according to this conventional system, the scanning locus of heads with respect to the tape upon reproduction becomes different from the scanning locus of the heads upon recording. As a result, a so-called tracking error is introduced.

When a tracking error is introduced during the speed-change reproduction in the previously proposed system described before, a so-called reverse tracking occurs partially. One of the heads scans a part of the track which is recorded by a head having the same azimuth angle as the other head, during the reverse tracking. With respect to the part of the track which is scanned under the reverse tracking, there is almost no reproduction of the recorded signal because of the azimuth loss. For this reason, when the tracking error is introduced, the level of the reproduced signal drops, and noise accordingly appears at irregular positions on the reproduced picture. Therefore, the noise part in the reproduced picture moves, and the signal-to-noise level of the entire reproduced picture becomes poor, and it is impossible to obtain a speed-change reproduction picture of high quality.

Accordingly, as a system for compensating for the tracking error upon changed-speed reproduction, there was a conventional system wherein a swinging device using a bimorph which comprises a pair of piezoelectric elements is separately provided for each of a pair of rotary magnetic heads of a rotary body. In this system, the magnetic heads are independently swung by the respective swinging devices, and control is carried out so that the magnetic heads accurately scan over the correct tracks.

However, this conventional system had disadvantages in that: (a) the construction of the apparatus becomes complex because there is a need to provide a swinging device for each of the rotary magnetic heads; (b) the tracking control cannot be carried out satisfactorily with respect to the magnetic heads in a mutually interrelated manner when there is inconsistency between the operations of the swinging devices; (c) the hysteresis of the operation becomes large; (d) a brush is required because a control voltage is applied to the swinging devices provided in the rotary body; and (e) a large swinging quantity cannot be obtained.

In addition, the conventional swinging device is designed so that the magnetic head is provided at the tip end of the bimorph and the rear end of the bimorph is fixed, to swing the magnetic head provided at the tip end of the bimorph upwards and downwards according to the bend in the bimorph. Hence, because the magnetic head is swung upwards and downwards by the swing at the tip end of the bimorph which swings about the fixed rear end, the magnetic head is in a horizontal state in its neutral position but is inclined upwards and downwards at the positions swung upwards and downwards, respectively. For this reason, the magnetic head does not make perpendicular contact with the magnetic tape at positions other than its neutral position. That is, the head gap does not entirely make contact with the magnetic tape at the positions other than the neutral position of the magnetic head, and results in an output loss at such positions other than the neutral position of the magnetic head. Thus, in this conventional system, even if the tracking control is carried out correctly, there were big disadvantages in that the output signal level decreased and the quality of the reproduced picture becomes poor. Particularly when diameter of the guide drum is set to a small value, the inclination of the magnetic heads becomes large, and the above disadvantages becomes even more notable. Therefore, it becomes difficult to reduce the diameter of the guide drum and reduce the overall size of the recording and reproducing apparatus.

Moreover, in order to overcome the aforementioned disadvantages (a) through (e) of the swinging device using bimorph described hereinbefore, a magnetic head swinging device was proposed in a U.S. patent application Ser. No. 178,852 (U.S. Pat. No. 4,365,279) in which the assignee is the same as that of the present application. In this proposed apparatus, a rotary body provided with a pair of magnetic heads along its diametral direction is supported at the center thereof to freely swing so as to undergo a so-called see-saw operation. According to this proposed apparatus, the construction of the apparatus becomes simple compared to the conventional apparatus which requires a swinging device for each of the magnetic heads, because the pair of magnetic heads in this proposed apparatus constantly undergo swinging in relation to each other. Further, there is an advantage in that problems such as the inconsistent operations between the swinging devices, are not introduced. However, the magnetic heads are also swung upwards and downwards about the center of rotation of the rotary body in this proposed apparatus. Hence, in states where the magnetic heads are swung upwards or downwards, the magnetic heads are inclined upwards or downwards. For this reason, the latter serious disadvantages of the previously described conventional apparatus, that is, the disadvantages in that the magnetic heads do not make perpendicular contact with the magnetic tape and the head gaps do not entirely make contact with the magnetic tape to introduce the output loss, are not eliminated in this proposed apparatus. In addition, although the gap between a rotary yoke and a coil must be set to a minimum in order to increase the driving force, the rotary yoke swings, and the above gap must be set large to a certain extent so as not to interfere with the swinging of the rotary yoke. As a result, a large driving force cannot be obtained, and there was a disadvantage in that degradation is introduced in the scanning characteristics of the magnetic heads.

SUMMARY OF THE INVENTION

Accordingly, it is a general object of the present invention to provide a novel and useful rotary magnetic head device in which the above described disadvantages have been eliminated.

Another and more specific object of the present invention is to provide a rotary magnetic head device capable of carrying out tracking control by displacing rotary magnetic heads along a direction perpendicular with respect to a rotational plane of the rotary magnetic heads, that is, along the direction of a rotary shaft. According to the device of the present invention, the rotary magnetic heads constantly make perpendicular contact with a magnetic tape even when the magnetic heads are displaced upwards and downwards, and head gaps entirely make contact with the magnetic tape. As a result, there is no decrease in the output level as in the conventional system, even when the magnetic heads are displaced due to tracking control, and it is possible to always obtain a constant reproduced output level. A reproduced picture of high quality can thus be obtained. In addition, the above described effects can still be obtained even if the size of a drum is reduced, and the overall size of the recording and/or reproducing apparatus can accordingly be reduced. Furthermore, the assembling of the rotary magnetic head device is easy, and moreover, restoration characteristics of the magnetic heads upon restoration of the magnetic heads to neutral positions is superior.

Still another object of the present invention is to provide a rotary magnetic head device capable of rotating together with a rotary drum, and also capable of carrying out tracking control by displacing rotary magnetic heads along the direction of a rotary shaft. According to the device of the present invention, the weight of a rotary structure which rotates with the rotary magnetic heads and is capable of being displaced upwards and downwards, can be reduced. As a result, the frequency of a resonant point of operation can be set to a high value, response characteristic of the tracking control operation becomes superior, and the power consumption becomes small. In addition, travel characteristic of the magnetic tape becomes superior because a drum rotates together with the rotary structure although the drum is a separate piece from the rotary structure.

Other objects and further features of the present invention will be apparent from the following detailed description when read in conjunction with the accompanying drawings.

BRIEF DESCRIPTION OF THE DRAWINGS

FIGS. 5(A) through 5(E) respectively are graphs showing signal waveforms, for explaining operations with respect to scanning of tracks shown in FIG. 4A and tracking control carried out with respect to the scanning of the tracks;

DETAILED DESCRIPTION

First, description will be given with respect to a first embodiment of a rotary magnetic head device according to the present invention by referring to FIG. 1. In a rotary magnetic head device 10 of a magnetic recording and/or reproducing apparatus, a guide drum 11 comprises a stationary upper drum 12 and a stationary lower drum 13 which are fixed to each other by a bracket 14. The lower drum 13 is fixed to a base plate 15. A cylindrical bearing holder 16 is fixed to the lower drum 13, and bearings 17a and 17b are supported at upper and lower parts of the bearing holder 16. A rotary shaft 18 is supported freely rotatable by the bearings 17a and 17b, in a state where the rotary shaft 18 is free to move upwards and downwards along the axial direction of the rotary shaft 18. A head bar 19 mounted with rotary magnetic heads 20a and 20b at both ends thereof, is fixed to an upper end part of the rotary shaft 18. A pulley 21 which integrally comprises a yoke holder 22, is fixed to a lower end part of the rotary shaft 18 by a fixing screw 23. A belt 24 is wound around the pulley 21.

Figure 1:
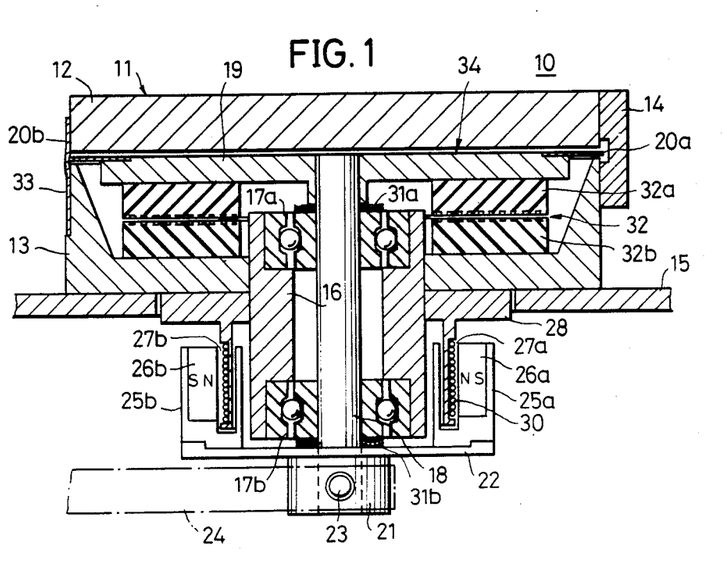
FIG. 1 is a view in vertical cross section showing a first embodiment of a rotary magnetic head device according to the present invention.
Figure 2:
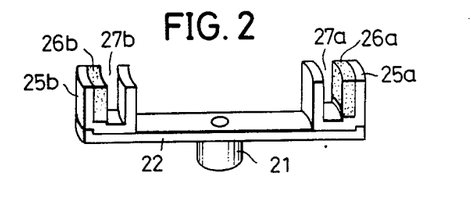
FIG. 2 is a perspective view showing a rotary yoke part of the device shown in FIG. 1.

As also shown in FIG. 2, substantially U-shaped rotary yokes 25a and 25b respectively comprising arcuate grooves 27a and 27b, are fixed to both ends of the yoke holder 22. Arcuate permanent magnets 26a and 26b are respectively fixed within the corresponding grooves 27a and 27b of the rotary yokes 25a and 25b, forming gaps at the grooves 27a and 27b. The permanent magnets 26a and 26b are arranged so that inner peripheral sides of the permanent magnets 26a and 26b are of the same magnetic polarity (the N-pole, for example). A coil supporting member 28 is fixed to the lower surface of the lower drum 13. A cylindrical coil bobbin 29 is formed at the lower surface of the supporting member 28, and a coil 30 is wound around the outer periphery of the coil bobbin 29. The above coil bobbin 29 and the coil 30 do not make contact with the rotary yokes 25a and 25b and the permanent magnets 26a and 26b, and are fitted within the grooves 27a and 27b of the rotary yokes 25a and 25b, inside magnetic fields formed by the permanent magnets 26a and 26b and the rotary yokes 25a and 25b. Wave washers 31a and 31b acting as resilient members, are respectively fitted between the head bar 19 and the bearing 17a and between the yoke holder 22 and the bearing 17b.

A rotary side part 32a of a rotary transformer 32 which transmits signals between a circuit of the magnetic recording and/or reproducing apparatus and the heads 20a and 20b, is fixed to the lower surface of the head bar 19. A stationary side part 32b of the rotary transformer 32 is fixed to the lower drum 13. A magnetic tape 33 is obliquely wrapped around the guide drum 11 throughout a range slightly over a semicircle of the guide drum 11, and caused to travel making contact with the guide drum 11. The heads 20a and 20b mounted on the head bar 19 make contact with the tape 33 while rotating within a gap formed between the upper and lower drums 12 and 13. The heads 20a and 20b are rotated by a motor (not shown) by way of the belt 24, together with the rotary shaft 18, to alternately record or reproduce signals onto or from tracks which are oblique with respect to the longitudinal direction of the tape 33.

When the coil 30 is energized, the permanent magnets 26a and 26b and the rotary yokes 25a and 25b receive a force urging movement in the upward or downward direction according to the direction of the energizing current, due to the magnetic field formed by the coil 30. As a result, the heads 20a and 20b move upwards and downwards along the axial direction of the rotary shaft 18, together with the yoke holder 22, rotary shaft 18, head bar 19, and the like. Hereinafter, the pulley 21, yoke holder 22, rotary yokes 25a and 25b, permanent magnets 26a and 26b, rotary shaft 18, head bar 19, and rotary side part 32a of the rotary transformer 32, which rotate, will be referred to as a rotary structure 34 as a whole. The maximum upward and downward displacement quantity of the heads 20a and 20b is in the range of 40 μm, for example, and the upward and downward displacement takes place while compressing the wave washers 31a and 31b. When the energizing current to the coil 30 is cut off, or if the energizing current becomes zero as the direction of the current is reversed, the rotary structure 34 and the heads 20a and 20b return to their neutral positions due to the resilient restoration force exerted by the wave washers 31a and 31b.

It is unnecessary to employ means such as a slip ring in means for energizing the coil 30 because the coil 30 is stationary and does not rotate, and the construction is accordingly simplified. In addition, the operation becomes highly reliable since noise and the like will not become mixed. Further, the coil 30 and the coil bobbin 29 do not swing, but are displaced linearly along the axial direction of the rotary shaft 18. Accordingly, the gaps 27a and 27b can be set to sufficiently small values within a range where the coil 30 and the coil bobbin 29 do not make contact with the permanent magnets 26a and 26b and the rotary yokes 25a and 25b, and it becomes possible to obtain a high driving efficiency.

The wave washers 31a and 31b function to restore the rotary structure 34 and the heads 20a and 20b to their neutral positions when the current flowing to the coil 30 becomes zero, and to damp the upward and downward displacement operation upon displacement control of the rotary structure 34. If the spring constant of the rotary structure 34 including the heads 20a and 20b is designated by k, the mass of the rotary structure 34 is designated by m, and the frequency of the resonant point of operation is designated by $f_c$, a relation $f_c = \frac{1}{2}\pi\sqrt{k/m}$ stands. Here, the spring constant k is large because the resonant point frequency $f_c$ is set to a large value, and set to a value suited to accurately restore the heads 20a and 20b and the rotary structure 34 to their neutral positions. As one example of the wave washers 31a and 31b, the wave washers are made of stainless steel, and the spring constant k is selected to a value within a range of approximately 1 to 2. The temperature characteristics are mutually compensated because the heads 20a and 20b and the rotary structure 34 are restored to their neutral positions according to the balance between the pair of upper and lower wave washers 31a and 31b, and there is no effect due to temperature variation.

In the present embodiment shown in FIGS. 1 and 2, the yoke holder 22 is a long and narrow plate, and the rotary yokes 25a and 25b comprises a pair of block pieces. However, the yoke holder 22 may be a circular plate, and the rotary yokes may be formed in a ring shape continuous throughout the entire periphery thereof.

Figure 3:
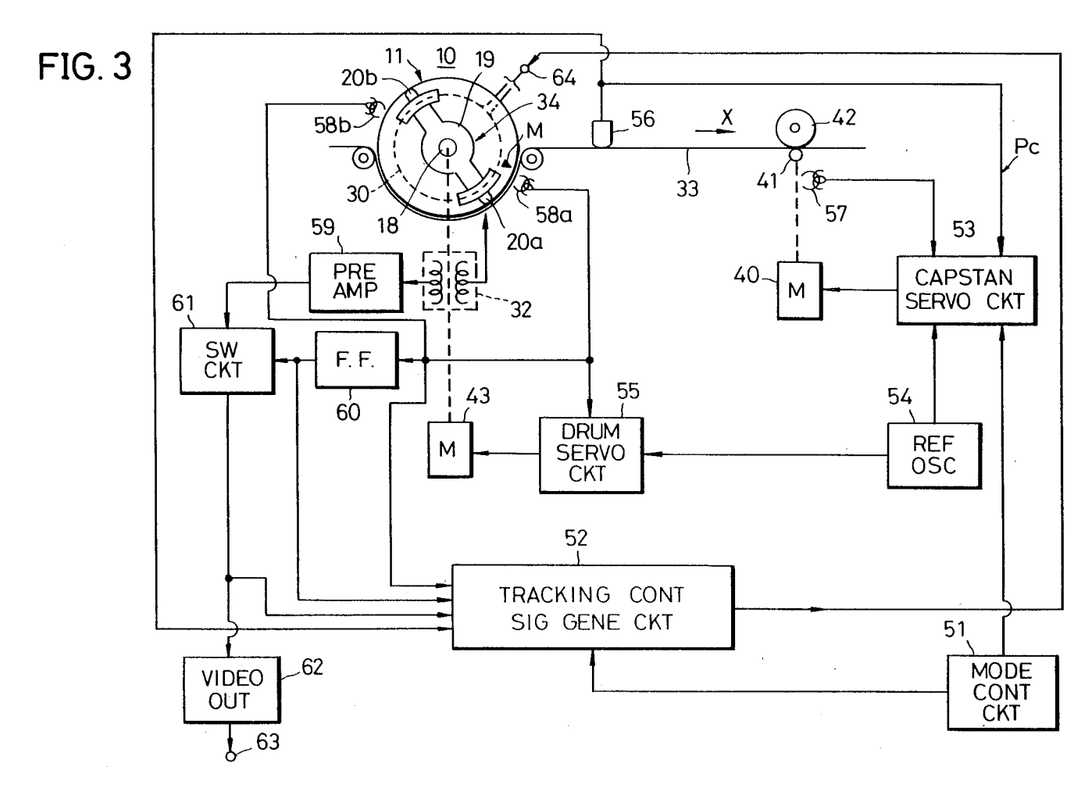
FIG. 3 is a systematic block diagram showing a magnetic recording and/or reproducing apparatus comprising a rotary magnetic head device according to the present invention and including a control system with respect to the rotary magnetic head device.

Next, description will be given with respect to a tracking control operation of the rotary magnetic head device 10, by referring to FIGS. 3 through 6. In FIG. 3, those parts which are the same as those corresponding parts in FIG. 1 are designated by the same reference numerals. The tape 33 is pinched between a pinch roller 42 and a capstan 41 rotated by a motor 40, and caused to travel in the direction of an arrow X. The rotary structure 34 is driven and rotated by a motor 43. Hence, as shown in FIG. 4A, the heads 20a and 20b scan in the direction of an arrow Y, oblique with respect to the longitudinal direction of the tape 33, to form and record a video signal on tracks t1, t2, . . . .

Figure 4A:
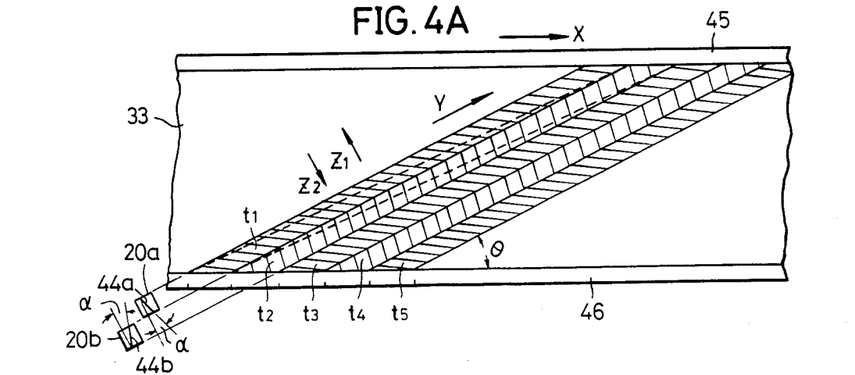
FIGS. 4A and 4B respectively are diagrams for explaining a track pattern on a magnetic tape and a scanning locus of a rotary magnetic head.

As shown in FIG. 4A, the heads 20a and 20b respectively comprise gaps 44a and 44b of azimuth angles inclined by an angle α (6°, for example) in mutually opposite directions with respect to a direction perpendicular to the scanning direction of the heads 20a and 20b, that is, of an azimuth angle α. The azimuth gaps 44a and 44b have the same track width. The tracks recorded and formed on the tape 33 traveling in the direction of the arrow X by the head 20a rotating in the direction of the arrow Y are designated by reference characters t1, t3, t5, . . . (where the subscripts of t are odd numbers). Similarly, the tracks recorded and formed by the head 20b are designated by reference characters t2, t4, t6, . . . (where the subscripts of t are even numbers). The tracks t1, t2, t3, . . . are in contiguous contact without gaps or guard bands formed therebetween, and the tape utilization efficiency is high. Each track is recorded with a part of the video signal corresponding to substantially one field of the video signal. A vertical synchronizing signal is positioned near an end of the track. An audio signal and a control signal are respectively recorded at the upper and lower lateral edges of the tape 33 on tracks 45 and 46 formed along the longitudinal direction of the tape.

During a normal reproduction, the tape 33 is caused to travel in the direction of the arrow X at the same speed as upon recording, and the heads 20a and 20b alternately scan and reproduce the tracks t1, t3, t5, ... and the tracks t2, t4, t6, ... . If the head 20a scans over the tracks t2, t4, ... and the head 20b scans over the tracks t1, t3, ... (that is, if the so-called reverse tracking is carried out), almost no signals are reproduced due to the azimuth loss. Accordingly, the rotational phases of the heads are generally controlled by a control signal so that a track recorded by a head having a gap of a certain azimuth angle is scanned over by a head having a gap of the same azimuth angle.

When the travel of the tape 33 having the above described track pattern is stopped to carry out a stillpicture reproduction, the scanning loci of the heads 20a and 20b of the conventional magnetic recording and reproducing apparatus starts from a starting end of the track t1, straddles the track t2 at an intermediate part, and terminates at the terminal end of the track t2 as indicated by a dotted lines in FIG. 4A, because the tape 33 is stopped. Consequently, the heads 20a and 20b carry out the scanning accompanying tracking error with respect to the tracks t1 and t2.

The head 20a reproduces the signal from the track t1 due to the positive tracking carried out with respect to the track t1, but does not reproduce the signal from the track t2 due to the reverse tracking carried out with respect to the track t2. Similarly, the head 20b does not reproduce the signal from the track t1 due to the reverse tracking carried out with respect to the track t1, and reproduces the signal from the track t2 due to the positive tracking carried out with respect to the track t2. Accordingly, the envelope of the signals reproduced by the heads 20a and 20b becomes as shown in FIG. 5(A). As shown in FIG. 5(A), the reproduced signal level during the reverse tracking of the heads 20a and 20b is substantially near zero as indicated by parts R where the signal essentially comprises a noise component. In FIG. 5(A), periods $H_a$ and $H_b$ respectively indicate scanning periods of the heads 20a and 20b.

Hence, in the device according to the present invention, the head 20a is continuously displaced as the head 20a scans, so that the head 20a continues to scan over the track t1 without scanning over the track t2. As the head 20a is displaced, the head 20b is also displaced in the same direction. Accordingly, when the head 20a finishes scanning over the track t1, the head 20b is at a position greatly shifted from the track t2, and the head 20b is instantaneously displaced to the position of the track t2 so as to scan over the track t2. The above described operation is repeated thereafter, and the heads 20a and 20b alternately scan over the tracks t1, t2, ... under positive tracking. As a result, the envelope of the reproduced signal level becomes as shown in FIG. 5(C) where there is no decrease in the level. Therefore, a still reproduction picture of high quality can be obtained wherein there is no effect due to noise and the signal-to-noise ratio is large.

When carrying out a slow-motion reproduction by causing the tape 33 to travel in the direction of the arrow X at a speed slower than the tape speed upon normal reproduction, the heads 20a and 20b scan along scanning loci of an inclination angle between the inclination angle $\theta$ of the tracks t1, t2, ... and the inclination angle of the scanning loci indicated by the dotted lines in FIG. 4A. On the other hand, when carrying out a quick-motion reproduction by causing the tape 33 to travel at a speed faster than the tape speed upon normal reproduction, the heads 20a and 20b scan along scanning loci of an inclination angle greater than the above inclination angle $\theta$ of the tracks. If the relationship between the traveling direction of the tape and the scanning direction of the heads is different from that shown in FIG. 4A, the relationship with respect to the inclination angle of the scanning loci accordingly becomes different.

Returning now to FIG. 3, a signal in accordance with a reproduction operation mode set at an operation mode control circuit 51, is supplied to a tracking control signal generating circuit 52 and a capstan servo circuit 53. A reference signal from a reference oscillator 54 is supplied to the capstan servo circuit 53 and a drum servo circuit 55.

The capstan servo circuit 53 frequency-divides the frequency of the reference signal from the reference oscillator 54, with a frequency dividing ratio varied according to a control signal obtained from the operation mode control circuit 51, to obtain a signal having a frequency in accordance with the operation mode. The capstan servo circuit 53 then obtains a control signal from the signal thus obtained from the capstan servo circuit 53, a control signal reproduced from the control track 46 on the tape 33 by a control head 56, and a pulse signal from a pulse generator 57 which generates pulses according to the rotation of the capstan 41, and supplies this control signal to the motor 40. The rotational speed of the motor 40 is controlled by the control signal hence applied thereto, according to the operation mode.

The drum servo circuit 55 obtains a control signal from a pulse signal generated by a tone wheel pulse generator 58a and the reference signal from the reference oscillator 54, according to the rotation of the rotary structure 34, and applies the control signal thus obtained to the motor 43 to control the rotation of the motor 43.

The video signal reproduced from the tape 33 by the heads 20a and 20b, is supplied to a switching circuit 61 through a rotary transformer 32 and a preamplifier 59. The pulse signals from the tone wheel pulse generators 58a and 58b are supplied to a flip-flop 60 to trigger this flip-flop 60. Accordingly, the flip-flop 60 generates rectangular pulses having a period which is identical to the rotational period of the rotary structure 34. The rectangular pulses are supplied to the switching circuit 61 for carrying out switching, and also to the tracking control signal generating circuit 52.

Among the signals from the preamplifier 59, the switching circuit 61 only supplies the reproduced signal from the head scanning over the tape under the positive tracking to a video signal output circuit 62 and the tracking control signal generating circuit 52. The video signal output circuit 62 subjects the video signal supplied thereto to a predetermined signal processing, and supplies a resultant output signal to a circuit in a succeeding stage through an output terminal 63. The video signal supplied to the tracking signal generating circuit 52 from the switching circuit 61, is detected of its amplitude fluctuation component by envelope detection, for example, and the alternating current component is used for forming a tracking control signal. In a case where pilot signals for tracking control are included within the reproduced signal, the tracking control signal generating circuit 52 may be designed to generate the tracking control signal by use of the pilot signals.

The tracking control signal generating circuit 52 forms a tracking control signal shown in FIG. 5(B) having a sawtooth waveform, according to the rectangular pulses obtained from the flip-flop 60. This tracking control signal is supplied to the coil 30 through a terminal 64. When the head 20a starts scanning from the track t1 during the period $H_a$, for example, the head 20a scans over the track t1 in a normal manner, but the head 20a will gradually shift towards the track t2 if the tracking control is not carried out. Hence, a tracking control current which gradually increases towards the negative direction from a zero point P1 as shown in FIG. 5(B), is applied to the coil 30. In FIG. 1, the permanent magnets 26a and 26b receive a force urging upward movement due to the energization of the coil 30, and the rotary structure 34 and the heads 20a and 20b accordingly move upwards. The displacement quantity of this upward movement is proportional to energizing current quantity applied to the coil 30. Therefore, as the tracking control current flowing through the coil 30 increases towards the negative direction as shown in FIG. 5(B), the upward displacement quantity of the heads becomes large, and the head 20a is displaced towards the direction of an arrow Z1 in FIG. 4A so as to accurately scan over the track t1.

When the head 20a finishes scanning over the track t1, a large positive current abruptly flows through the coil 30 as indicated by a point P2 in FIG. 5(B). As a result, the rotary structure 34 and the heads 20a and 20b abruptly move downwards (that is, displaced towards the direction of an arrow Z2 in FIG. 4A), and the head 20b starts to scan from the starting end of the track t2. Next, the positive control current applied to the coil 30 gradually decreases, and the rotary structure 34 gradually moves upwards towards a height position corresponding to the neutral position. As a result, the head 20b is gradually displaced towards the direction of the arrow Z1 in FIG. 4A. At a point P3 where the head 20b finishes scanning over the track t2, the control current applied to the coil 30 becomes zero. Therefore, at this point P3, the rotary structure 34 and the heads 20a and 20b are restored to their neutral positions by the restoration forces exerted by the wave washers 31a and 31b.

Next, the head 20a starts scanning from the starting end of the track t1, and the above described operations are repeated. Accordingly, the heads 20a and 20b alternately and accurately scan over the tracks t1 and t2 repeatedly, to reproduce the video signal. Thus, a reproduced signal having no decrease in the reproduced signal level as shown in FIG. 5(C) can be obtained. It is hence possible to obtain a still reproduction picture of high quality wherein no noise is present and the picture quality is uniform throughout the entire picture.

According to the aforementioned conventional head swinging device using bimorph and the rotary magnetic head device employing a head swinging device which undergoes the see-saw operation, the heads become inclined as the heads are swung, as described before. As a result, the heads do not make perpendicular contact with the tape, and the level of the reproduced signal decreases. The reproduced output level (envelope) in this case becomes as shown in FIG. 5(D). On the other hand, according to the device of the present invention, the heads 20a and 20b constantly make perpendicular contact with the tape 33 even when the heads 20a and 20b are displaced from their neutral positions. Therefore, according to the device of the present invention, the head gaps constantly make contact with the tape 33 in their entirety, and substantially no decrease is introduced in the reproduced signal level as shown in FIG. 5(C).

In the device according to the present invention, it is not necessarily essential for the heads 20a and 20b to have gaps of mutually different azimuth angles, and the heads 20a and 20b may be heads having regular gaps comprising no azimuth angle. In this case, the waveform of the tracking control signal current generated by the tracking control signal generating circuit 52 becomes as shown in FIG. 5(E). In FIG. 5(E), the signal current is constantly zero or positive. However, by adjusting the stopping position of the tape, it is possible to relatively set the zero position between peak-to-peak of the current waveform as indicated by a dotted line in FIG. 5(E).

The waveform of the tracking control current shown in FIG. 5(B) is a waveform upon still-picture reproduction. During other mode such as a slow-motion reproduction and quick-motion reproduction, a control current having a waveform in accordance with the mode is generated by the tracking control signal generating circuit 52.

The construction of the tracking control signal generating circuit 52 is not limited to that described before. For example, as disclosed in a U.S. patent application Ser. No. 214,762 entitled "TRACKING CONTROL SYSTEM IN A MAGNETIC RECORDING AND-/OR REPRODUCING APPARATUS", the tracking control signal generating circuit may be designed so that tracking pilot signals are recorded on the tracks beforehand to obtain the tracking control signal from reproduced tracking pilot signals. According to the circuit of this system, the tracking error is constantly detected, and the tracking control signal is generated according to the tracking error in order to eliminate the tracking error. Hence, when carrying out the still-picture reproduction as shown in FIG. 4A, a tracking control signal having a waveform shown in FIG. 5(B) is generated in this case.

Figures 4B, 5:
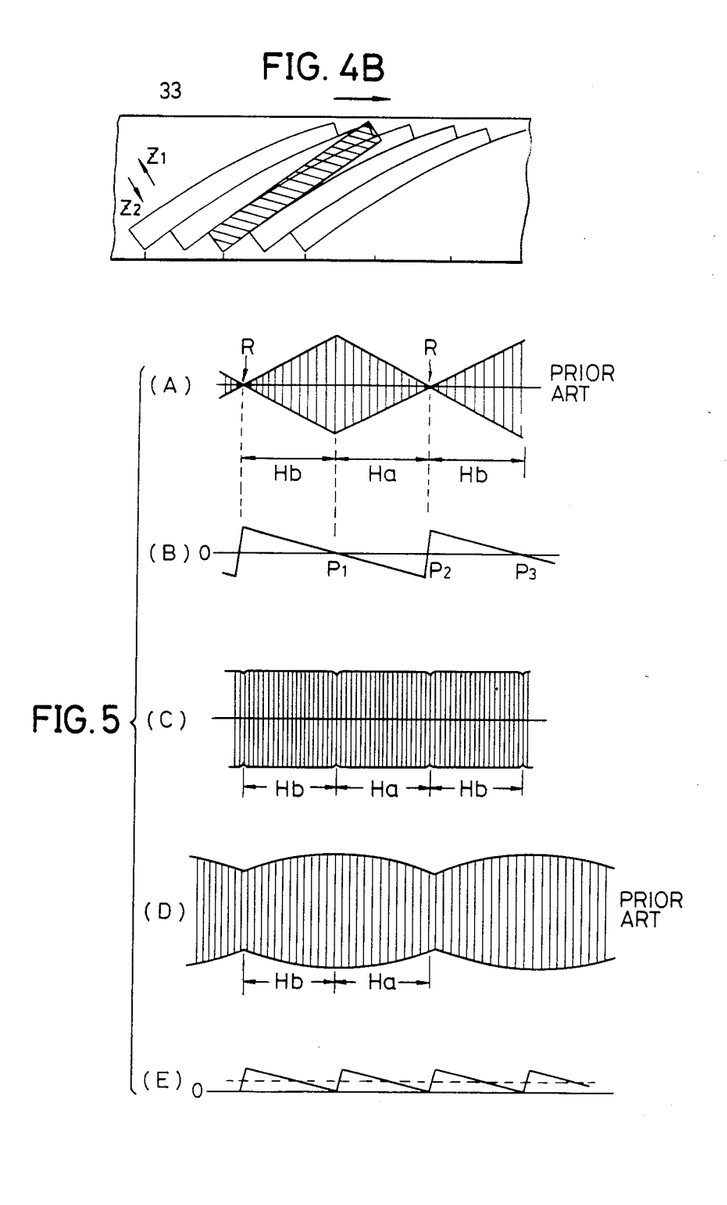
Figure 6:
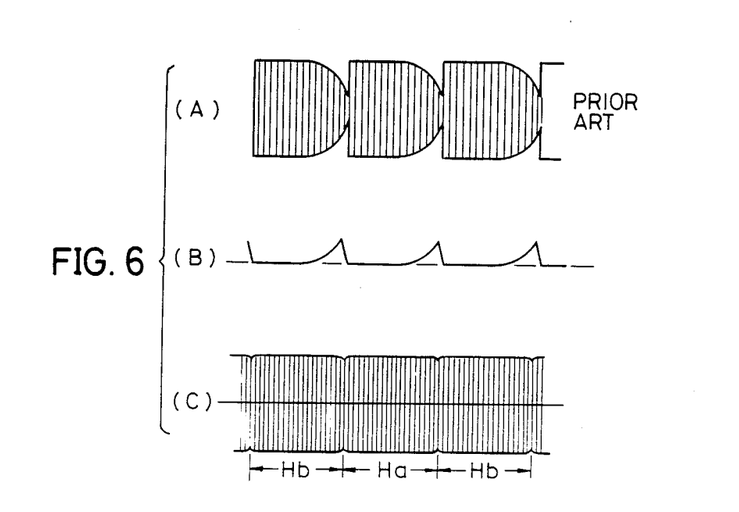
FIGS. 6(A) through 6(C) respectively are graphs showing signal waveforms, for explaining operations with respect to scanning of tracks shown in FIG. 4B and tracking control carried out with respect to the scanning of the tracks.

In addition, if the above circuit which generates the tracking control signal according to the tracking error is used as the tracking control signal generating circuit, tracking control can be carried out effectively when scanning and reproducing tracks comprising bends as shown in FIG. 4B. That is, if there are bends in each track at the upper part of the tape 33 due to some cause and the tracks comprising these bends are linearly scanned without the tracking control, the reproduced output signal greatly decreases at the track parts comprising the bends. As a result, the envelope of the reproduced output signal will become as shown in FIG. 6(A). However, in this case, a tracking control signal having a waveform shown in FIG. 6(B) will be generated according to the tracking error, and the rotary structure 34 and the heads 20a and 20b are moved downwards at the track parts comprising the bends and displaced along the direction of the arrow Z2, to carry out control so that the heads 20a and 20b follow the bends in the track and accurately scan over the tracks. As shown in FIG. 6(C), a reproduced signal of high quality comprising no level decrease can thus be obtained.

Next, description will be given with respect to a second embodiment of a rotary magnetic head device according to the present invention. As described heretofore, it is desirable to set the resonant point frequency $f_c$ of the operation to a large value, and in order to achieve this, the mass m of the rotary structure must be small. However, in the first embodiment of the invention, the mass of the rotary structure is large because the rotary side part 32a of the rotary transformer 32 is also mounted to the rotary structure 34. The first embodiment thus suffers disadvantages in that the resonant point frequency of the operation becomes low, and the power consumption becomes high. Accordingly, in the present embodiment of the invention, measures are taken so that the rotary side part of the rotary transformer is not mounted to the rotary body, in order to reduce the mass of the rotary structure.

In addition, the upper drum 12 is stationary. For this reason, the friction due to the traveling tape at the peripheral surface of the drum becomes large, and the tape travel characteristic becomes poor. Furthermore, because the head bar 19 is moved upwards and downwards within the gap formed between the upper and lower stationary drums 12 and 13, the gap between the drums 12 and 13 must be made large by taking into account the displacement quantity of the heads 20a and 20b when the heads 20a and 20b are moved upwards and downwards. However, if the gap between the drums 12 and 13 is set to a large value, the tape travel characteristic becomes poor, and moreover, there is a problem in that the contact between the heads and the tape becomes unstable. Therefore, according to the present embodiment, the upper drum is a rotary drum, and further, the head bar is designed to be displaceable upwards and downwards independently of the upper rotary drum.

Figure 7:
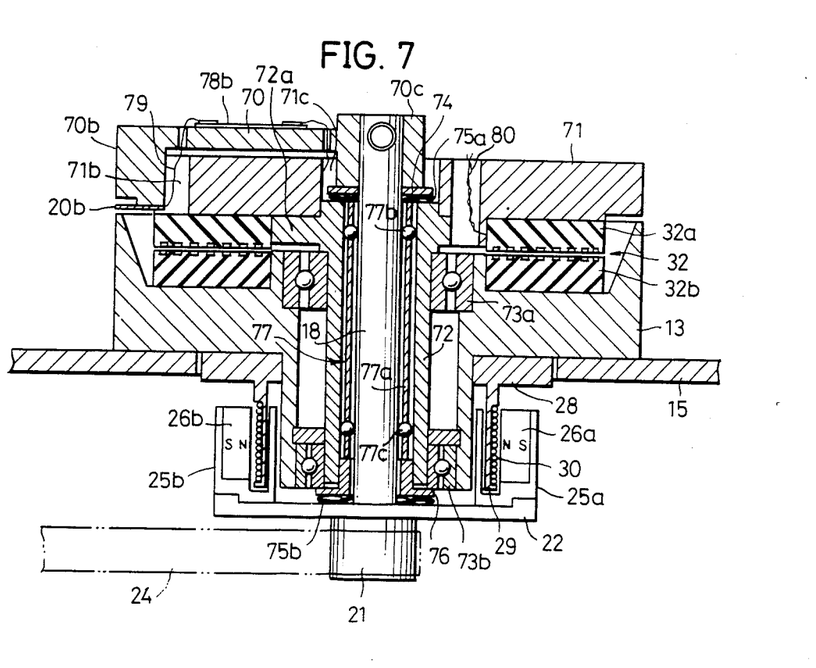
FIG. 7 is a view in vertical cross section showing a second embodiment of a rotary magnetic head device according to the present invention.
Figures 8, 9:
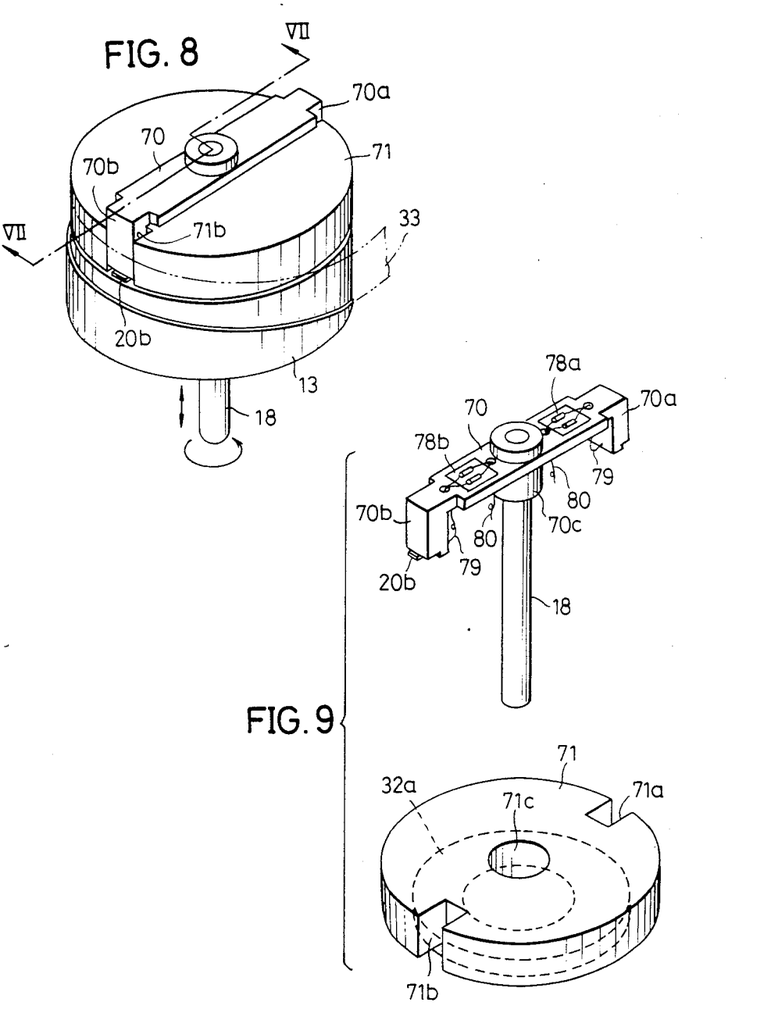
FIG. 8 is a perspective view showing an essential part of the device shown in FIG. 7.
FIG. 9 is a disassembled perspective view showing a part of the essential part shown in FIG. 8.

The present embodiment will now be described in detail by referring to FIGS. 7 through 9. In FIG. 7, those parts which are the same as those corresponding parts in FIG. 1 are designated by the same reference numerals, and their description will be omitted. FIG. 7 is a view in vertical cross section along a line VII—VII in FIG. 8.

A head bar 70 comprises downwardly hanging arms 70a and 70b at both ends thereof, and is fixed to the rotary shaft 18. The heads 20a and 20b are respectively mounted at lower ends of the arms 70a and 70b. Cutouts 71a and 71b are formed in a rotary upper drum 71 at opposing positions along the diametral direction thereof. The arms 70a and 70b of the head bar 70 respectively fit into the cutouts 71a and 71b. The widths of the cutouts 71a and 71b are selected so that there is no unnecessary play with respect to the arms 70a and 70b, and so as not to introduce excess frictional resistance with respect to the upward and downward movement of the arms 70a and 70b. The rotary side part 32a of the rotary transformer 32 is mounted to the lower surface of the rotary upper drum 71. The rotary upper drum 71 is fixed to a rim part 72a of a rotary cylinder 72. The rotary cylinder 72 is born freely rotatable with respect to the stationary lower drum 13, by bearings 73a and 73b. A washer 74 and a wave washer 75a are inserted between the upper end of the rotary cylinder 72 and the head bar 70, and a stopper 76 and a wave washer 75b are inserted between the lower end of the rotary cylinder 72 and the yoke holder 22. The rotary shaft 18 is born freely movable upwards and downwards along the axial direction with respect to the rotary cylinder 72, by a movable shaft ball bearing 77 which comprises steel balls 77b and 77c supported freely rotatable in a cylinder 77a.

The head bar 70 is rotated, as the belt 24 is driven and the rotary shaft 18 is rotated together with the yoke holder 22, rotary yokes 25a and 25b, and permanent magnets 26a and 26b. When the head bar 70 rotates, the heads 20a and 20b alternately record or reproduce signals onto or from tracks which are formed on the tape 33 obliquely with respect to the longitudinal direction of the tape 33. Accompanied by the rotation of the head bar 70, the side surfaces of the cutouts in the rotary upper drum 71 are respectively pushed by the side surfaces of the arms 70a and 70b of the head bar 70, and the rotary upper drum 71 rotates together with the head bar 70.

Printed circuits 78a and 78b are provided on the upper surface of the head bar 70, and the heads 20a and 20b are respectively connected to one corresponding end terminal of the printed circuits 78a and 78b by a lead wire 79. The other ends of the printed circuits 78a and 78b are connected to the rotary side part 32a of the rotary transformer 32 by a lead wire 80. Even if the head bar 70 is displaced upwards and downwards with respect to the rotary upper drum 71 and the rotary transformer 32, the displacement quantity is in the range of 40 μm at the maximum. Furthermore, no interference will be introduced with respect to the electrical connections, because the lead wire 80 is sufficiently provided.

When the tracking control signal current is applied to the coil 30, the permanent magnets 26a and 26b receive a force urging relative upward or downward movement according to the control signal current, similarly as in the first embodiment of the invention. The head bar 70 is thus displaced upwards or downwards along the axial direction of the rotary shaft 18. A boss 70c of the head bar 70 is fitted into a hole 71c in the rotary upper drum 71, and the arms 70a and 70b are fitted into the cutouts 71a and 71b in a freely displaceable state. Accordingly, the head bar 70 rotates the rotary upper drum 71, and is displaceable upwards and downwards independently of the rotary upper drum 71.

According to the present embodiment, the rotary side part 32a of the rotary transformer 32 is mounted to the rotary upper drum 71, and not to the head bar 70. As a result, the mass of the rotary structure which is displaced upwards and downwards, is accordingly reduced. In addition, the travel characteristic of the tape 33 is superior because the upper drum 71 is designed to be rotatable.

Further, the present invention is not limited to these embodiments, but various variations and modifications may be made without departing from the scope of the present invention.

What is claimed is:

1. A rotary magnetic head device comprising:
 a rotary body having magnetic heads mounted thereon, said heads rotating while scanning over a traveling magnetic tape, said heads scanning over tracks formed obliquely with respect to the longitudinal direction of the tape to reproduce recorded signals;
 bearing means for bearing said rotary body in a freely rotatable state and in a state freely displaceable in a direction parallel to an axis of rotation of said rotary body; and
 displacing means for electromagnetically displacing said rotary body along a path parallel to the axis of rotation thereof so that said heads are displaced simultaneously to follow and scan over tracks on said tape.

2. A rotary magnetic device as claimed in claim 1 in which said rotary body comprises a rotary member having said heads mounted thereon, a rotary shaft having said rotary member fixed at an upper part thereof for rotating said rotary member, a yoke member comprising rotary yoke parts, said yoke member being fixed to a lower end of said rotary member and rotating unitarily with said rotary member, and permanent magnets mounted on said rotary yoke parts, said displacing means comprising a coil in a magnetic field formed by said permanent magnets and said rotary yoke parts for applying a displacing force to said permanent magnets and said rotary yoke parts so as to displace said permanent magnets and said rotary yoke parts along the axial direction of said rotary shaft, said coil having a tracking control signal current applied thereto so that said heads follow and scan over the tracks on said tape.

3. A rotary magnetic device as claimed in claim 2 in which each of said rotary yoke parts has a U-shaped cross section and comprises a groove, said permanent magnets being provided within the respective grooves of said rotary yoke parts, said coil being fitted within said grooves of said rotary yoke parts without making contact with said rotary yoke parts and said permanent magnets so that said coil is positioned in the magnetic field formed by said permanent magnets and said rotary yoke parts.

4. A rotary magnetic device as claimed in claim 2 in which said bearing means bears said rotary shaft in a freely rotatable state and so that said rotary shaft is freely displaceable along an axial direction thereof.

5. A rotary magnetic device as claimed in claim 2 which further comprises resilient members respectively inserted between said bearing means and said rotary member and between said bearing means and said yoke member, said resilient members acting to restore said rotary body to a neutral position of said rotary body.

6. A rotary magentic device as claimed in claim 5 in which each of said resilient members comprises a wave washer.

7. A rotary magnetic device as claimed in claim 2 which further comprises a guide drum making contact with said tape throughout a predetermined range for guiding said tape, said guide drum comprising a rotary upper drum and a stationary lower drum, said rotary upper drum enabling a displacement of said rotary member along the axial direction and being engaged with said rotary member so as to rotate together with said rotary member when said upper drum is pushed due to a rotation of said rotary member.

8. A rotary magnetic device as claimed in claim 7 in which said rotary upper drum comprises cutouts, parts of said rotary member being engaged with said cutouts in a state freely displaceable along the axial direction.

9. A rotary magnetic device as claimed in claim 7 which further comprises a rotary transformer comprising a rotary side part and a stationary side part electrically connected to said heads, said rotary transformer transmitting signals with respect to said heads, said rotary side part being mounted on said rotary upper drum.

* * * * *